(12) United States Patent
Chabas et al.

(10) Patent No.: US 8,950,787 B2
(45) Date of Patent: Feb. 10, 2015

(54) PIPE AND PIPE ASSEMBLY PROVIDED WITH LAYERS OF ELECTRICALLY CONDUCTIVE MATERIAL FOR CONVEYING SUBSTANCES

(75) Inventors: Jean-Alain Chabas, Cesson Sevigne (FR); Brian Minnis, Crawley West Sussex (GB)

(73) Assignee: Vam Drilling France, Cosne Cours sur Loire (FR)

( * ) Notice: Subject to any disclaimer, the term of this patent is extended or adjusted under 35 U.S.C. 154(b) by 116 days.

(21) Appl. No.: 13/822,136

(22) PCT Filed: Oct. 3, 2011

(86) PCT No.: PCT/EP2011/067221
§ 371 (c)(1),
(2), (4) Date: Mar. 11, 2013

(87) PCT Pub. No.: WO2012/045698
PCT Pub. Date: Apr. 12, 2012

(65) Prior Publication Data
US 2013/0186669 A1    Jul. 25, 2013

(30) Foreign Application Priority Data
Oct. 4, 2010 (FR) ...................................... 10 58029

(51) Int. Cl.
*F16L 11/118*   (2006.01)
*E21B 17/00*   (2006.01)
*E21B 17/02*   (2006.01)
*F16L 9/02*   (2006.01)
*F16L 15/00*   (2006.01)
*F16L 25/01*   (2006.01)

(52) U.S. Cl.
CPC ............. *E21B 17/003* (2013.01); *E21B 17/028* (2013.01); *F16L 9/02* (2013.01); *F16L 15/001* (2013.01); *F16L 25/01* (2013.01)
USPC ...................................... 285/149.1; 340/854.7

(58) Field of Classification Search
USPC .................. 285/149.1; 174/88 R, 21 R, 22 C; 138/109, 155; 166/65.1; 367/82
See application file for complete search history.

(56) References Cited

U.S. PATENT DOCUMENTS

| 2,379,800 A | 7/1945 | Hare |
| 4,012,092 A | 3/1977 | Godbey |
| 6,392,317 B1 | 5/2002 | Hall et al. |

(Continued)

OTHER PUBLICATIONS

International Search Report Issued Nov. 30, 2011 in PCT/EP11/067221 Filed Oct. 3, 2011.

*Primary Examiner* — Aaron Dunwoody
(74) *Attorney, Agent, or Firm* — Oblon, Spivak, McClelland, Maier & Neustadt, L.L.P.

(57) ABSTRACT

An ensemble including a pipe for transporting substances which can flow, the pipe having a structure forming a coaxial transmission line including: a first tubular layer of electrically conductive material; a second tubular layer of electrically conductive material; and at least one first layer of dielectric material mounted in-between the first and the second layers of electrically conductive material, such that: the first layer of electrically conductive material forms an outer conductor of a section of the coaxial transmission line; the second layer of electrically conductive material forms an inner conductor of the section of the coaxial transmission line, and further including an electromagnetic coupler coupling the coaxial transmission line with a complementary coaxial transmission line carried by a pipe complementary to the pipe.

10 Claims, 5 Drawing Sheets

(56) References Cited

U.S. PATENT DOCUMENTS

| | | | |
|---|---|---|---|
| 6,952,170 B2* | 10/2005 | Aiello | 340/854.4 |
| 8,134,476 B2* | 3/2012 | Chemali et al. | 340/854.3 |
| 8,242,928 B2* | 8/2012 | Prammer | 340/853.7 |
| 8,704,677 B2* | 4/2014 | Prammer | 340/853.7 |
| 2004/0079525 A1 | 4/2004 | Boyadjieff | |
| 2004/0177956 A1 | 9/2004 | Boyadjieff | |
| 2008/0041575 A1 | 2/2008 | Clark et al. | |
| 2008/0110638 A1* | 5/2008 | Hall et al. | 166/381 |
| 2008/0247273 A1* | 10/2008 | Chemali et al. | 367/82 |
| 2009/0322553 A1 | 12/2009 | Clark et al. | |
| 2011/0155470 A1 | 6/2011 | Boulet | |
| 2011/0290475 A1 | 12/2011 | David et al. | |
| 2012/0048623 A1 | 3/2012 | Lafuente et al. | |
| 2012/0111555 A1 | 5/2012 | Leveau et al. | |
| 2012/0122330 A1 | 5/2012 | Roussie | |
| 2013/0169385 A1* | 7/2013 | Chabas et al. | 333/24 R |
| 2014/0144538 A1* | 5/2014 | Sillasen et al. | 138/109 |

\* cited by examiner

PIPE AND PIPE ASSEMBLY PROVIDED WITH LAYERS OF ELECTRICALLY CONDUCTIVE MATERIAL FOR CONVEYING SUBSTANCES

1. FIELD OF THE INVENTION

The present invention relates to the field of pipes dedicated for conveying substances (i.e. liquids and gases (fluids), slurries, powders, masses of small solids, etc.) which can flow, particularly (but not exclusively) pipes suitable for use in downhole environments, such as drill pipes used in oil and gas exploration. The present invention particularly relates to a system for transmitting data at high data rates through pipes of this type.

2. TECHNOLOGICAL BACKGROUND

It is sought more particularly here below in this document to describe problems existing in the field of drilling pipes. The invention of course is not limited to this particular field of application, but is of interest for any technique that implements a structure comprising at least one pair of successive pipes through which it is intended to transmit data.

For illustrative purposes, FIG. 1 depicts a drilling installation 1 comprising a string of drilling tools 10 that convey drilling fluid and rotational power from the top-drive system 11 (denoted hereafter TDS) on the surface down to the bottom-hole assembly 12 (denoted hereafter BHA) and drill bit underground. Most of these tools are drill pipes of length typically 10 m, which are mechanically connected to each other by pin and box threaded end sections. As the total distance between the BHA 12 and the TDS 11 at the surface can be in excess of 3 km, there can be as many as 300 separate sections of drill pipe. Mud and other drilling fluids pass through the centre of the pipes, where operating temperatures can reach more than 200° C.

In the underground drilling industry, high-speed, bi-directional data communications are required between the TDS 11 and the BHA 12. High-speed data communication of this type can substantially increase the efficiency of the drilling rig by facilitating much improved "Measurement While Drilling (MWD)", "Logging While Drilling (LWD)" and "Directional Drilling (DD)" whilst reducing non-productive time. Real-time, rapid data collection (such as temperature, pressure, salinity, etc.) in the uplink direction and corresponding control data sent in the downlink direction enable optimisation of the drilling process for more accurate well placement and extended reach without the need for a suspension of operations. Unfortunately, such is the structure of the drilling installation and the environmental conditions in which it must operate that reliable, fast, bi-directional data communications are very difficult to provide.

A first known data communication system for use in a drill string is based on a mud pulse technique. This technique consists of sending sonic pulses up and down the drilling fluid in the pipes. The chief drawbacks to this mud pulse system are that the data rate is slow, i.e. less than 10 baud, the system is complex and expensive, the results can be inconsistent, and the range of performance can be limited. Thus, this first known system tends to be used only as an emergency back-up when all other means of communication have failed.

To achieve much higher data rates, it is known in the state of the art to use a transmission line inserted into the string of drill pipes to make a connection between an electronic data interface 110 at the surface of the rig and a downhole interface 120 underground. However, given the necessity of using separate sections of pipe and the way in which they must be assembled on site, the transmission line cannot be a single length of line but must also be a series of separate sections whose length is roughly equal to that of the drill pipes and whose ends must be coupled together by a coupling device (or coupler) to ensure reliable data communications along the entire length of the link, at all times and under all operating conditions.

The electrical losses along the length of the data link in the drill string must be kept within manageable limits, so as to ensure that the transmitted signal from one end reaches the receiver at the other end with an adequate signal-to-noise ratio. Due to the length of the drill string, the individual drill pipes (called Wired Drill Pipes or WDPs) are assembled into groups 130, each group of which interfaces to its neighbor via a repeater 140. The role of the repeater is to detect and demodulate the incoming signals arriving from both the uplink and downlink directions, remove unwanted noise, regenerate and amplify the required signals and pass them onto the next group of pipes and repeater. As illustrated in FIG. 1, there will be several of these pipe groups 130 and repeaters 140, the exact number depending upon the power budget for the whole link. However, the number of repeaters must be kept as low as possible to minimise both the cost of installation and maintenance. The repeaters are generally battery powered. Hence, it is essential that the losses in both the sections of the passive transmission line and the couplers are kept as low as is technically feasible.

Different data communication systems using transmission line and couplers have been proposed. In this regard, pipes equipped with electrical paths such as those described in the documents US-2004/0177956, US 2008/0041575 or even U.S. Pat. No. 2,379,800 are known in the prior art.

A second known data communication system uses a transmission line passing down the length of the drill string whereby the separate sections of transmission line are connected together with specially-designed electrical connectors. This second system suffered badly from the lack of reliability in the electrical connections due to the presence of oil, grease, water, sand and other abrasive materials at the site of the joint.

A third known system is presented in the patent document U.S. Pat. No. 6,670,880 B1. This system uses couplers based on magnetic coupling. Each pipe comprises a passage formed in the pipe wall for enabling the passage of a transmission line. Embedded in the shoulders of each end of a pipe is a hollow ring of electrically insulating, magnetic material, inside of which is located a coil of wire. In operation, i.e. when the ends of first and second pipes come together, a varying current applied to the first coil of the first pipe generates a varying magnetic field in the first electrically insulating, magnetic ring of the first pipe, which varying magnetic field is conducted to and thereby produces a varying magnetic field in the second electrically insulating, magnetic ring of the second pipe, which magnetic field thereby generates a varying electrical current in the second coil of the connected second pipe. The coupling is substantially independent of the angular orientation of the two pipes and is not reliant on any electrical connection. This system permits reliable, bi-directional data transmission along the drill string at data rates of about 50 kbits/s. Higher data rates however are difficult to achieve owing to the use of magnetic materials and the relatively high inductance of the coupled coils.

To make the further advances in drilling performance now being demanded by industry, the data rates must be increased towards a new target value of about 50 Mb/s.

3. AIMS OF THE INVENTION

The invention in at least one of its embodiments is aimed at overcoming these different drawbacks of the prior art.

More specifically, an objective of at least one embodiment of the invention is to provide a pipe through which substances can flow and through which data can be transmitted at high data rates (i.e. high frequency signals, or HF signals for 'data payload' greater than 150 kb/s, preferably greater than 1 Mb/s, and particularly preferably up to 50 Mb/s).

Another aim of at least one embodiment of the invention is to provide a pipe of this kind that can be used in oil and gas exploration and production.

Over the course of time, the angular variation of one pipe with its neighbor pipe can vary due to wear and tear of the threads. Thus, it is another aim of at least one embodiment of the invention to provide a coupler enabling the coupling of two successive pipes, that makes it possible to achieve low-loss transmission and that copes with a large angular uncertainty between the pipes.

Another aim of at least one embodiment of the invention is to provide a coupler of this kind that can be rapidly and safely formed, when two successive pipes are connected end-to-end.

Another aim of at least one embodiment of the invention is to provide a coupler of this kind that costs little to manufacture.

4. SUMMARY OF THE INVENTION

According to a first aspect of the present invention, an ensemble comprising a pipe is provided for conveying substances which can flow. The pipe is such that it has a structure forming a coaxial transmission line comprising:
- a tubular first layer of electrically conductive material;
- a tubular second layer of electrically conductive material; and
- at least one first layer of dielectric material mounted in-between the first and the second layers of electrically conductive material, such that:
  - the first layer of electrically conductive material forms an outer conductor of a section of the said coaxial transmission line;
  - the second layer of electrically conductive material forms an inner conductor of the section of said coaxial transmission line and in that the ensemble comprises an electromagnetic coupler to couple the said coaxial transmission line with a complementary coaxial transmission line carried by a pipe complementary to the said pipe.

This embodiment of the invention relies on a wholly novel and inventive approach to the transmission of data through a pipe for conveying substances, for example, drilling fluids, slurries issued from a drilling process. Indeed, it is proposed to arrange within the pipe a multi-layer structure that forms a coaxial transmission line.

In comparison with the pipe described above in relation to the prior art, the pipe of the invention has a structure which is simple to manufacture, since it does not need any passage to be formed in the pipe wall for enabling the passage of a transmission line. Indeed, in the invention, the coaxial transmission line is tubular and comprises a structure formed of two concentric tubular layers, forming the exterior and interior conductors of the pipe respectively.

In particular, the electromagnetic coupler can be partly accommodated in a recess formed by an end of the pipe, preferably the box end of the pipe, the recess extending between the first layer of electrically conductive material and the second layer of electrically conductive material.

The pipe comprises a main body having an inner wall. Advantageously, the said first layer of electrically conductive material is placed against the inner wall of the main body of the pipe. This first layer is conformal with, namely, is affixed to, this inner wall. For example, the said first layer of tubular electrically conductive material has a full surface.

Thus, the structure is simple, as it is simply coaxial.

Advantageously, the said second layer of electrically conductive material forms an active inner wall of the pipe. For example, this second tubular layer of electrically conductive material has a full surface.

The full surface for the conductive layers is preferred, since it performs better at the wavelengths used than structures which are open, split or formed of an array of wires. However, this is not mandatory, and compromises may be necessary, involving surfaces which are not full.

In this embodiment, the second layer of electrically conductive material is used at the same time as a passage for conveying substances (i.e. active inner wall of the pipe) and as an inner conductor of a coaxial transmission line for transmitting data.

Advantageously, this second layer of electrically conductive material is not in direct contact with the transported substances. Indeed, it can be covered over its whole inner circumference by a protective layer, for example, made of steel or composite materials.

According to a particular embodiment of the invention, the structure of the pipe is a cylindrical structure.

Thus, the manufacturing process is simple.

Advantageously, the first and second layers of electrically conductive material are made of a non-magnetic material.

This prevents eddy-current losses that would otherwise be incurred on the surface of the first and second layers of electrically conductive material. In this way, transmission losses are minimized.

In a preferred embodiment of the invention, said pipe is a drill pipe adapted to be used in oil and gas exploration or production.

According to a second aspect of the present invention, a pipe assembly is provided, comprising:
- at least one pair of successive ensembles as mentioned above,
- such that the electromagnetic coupler enables a coupling of a pair of successive pipes.

The electromagnetic coupler according to the invention has the function of guiding the waves of the signals carried in the coaxial transmission line.

Advantageously, each pipe of a given pair of successive pipes comprises a recess formed at an end of the pipe, the recess extending between the first layer of electrically conductive material and the second layer of electrically conductive material.

Advantageously, for the said given pair, when the pipes are connected end-to-end, the recesses are facing each other, so as to form together a cavity adapted to receive the said electromagnetic coupler.

It is proposed to introduce an electromagnetic coupler at the junction of two successive pipes in order to take advantage of an electromagnetic coupling to connect two sections of coaxial transmission line, thus making it possible to allow the two sections of coaxial transmission line to have a large angular uncertainty in relation to one another, while maintaining high data rate communication between these two sections. Indeed, no direct electrical connection is required between the two sections of coaxial transmission line.

In comparison with the magnetic coupling mechanism described above in relation to the prior art, the electromagnetic coupling mechanism of the invention has a much higher frequency of operation and reduced transmission losses, since it does not use any magnetic materials or elements, making it possible to achieve much higher data rates. Thus, the coupler of the present invention is particularly well suited for using in high-speed drill pipe telemetry system where sections of drill pipe are connected end-to-end.

In a preferred embodiment of the invention, each electromagnetic coupler has a structure comprising:
- a second layer of dielectric material;
- a third layer of dielectric material; and
- a third layer of electrically conductive material mounted in-between the second and third layers of dielectric material.

Advantageously, for the said given pair, when the pipes are connected end-to-end:
- the second layer of dielectric material extends inside the cavity in such a way that a portion of said first layer of electrically conductive material of each pipe is separated from the third layer of electrically conductive material by the second layer of dielectric material; and
- the third layer of dielectric material is extending inside the cavity such that a portion of said second layer of electrically conductive material of each pipe is separated from the third layer of electrically conductive material by the third layer of dielectric material.

This multi-layer structure is simple to manufacture.

Advantageously, the second layer of dielectric material is thicker than the third layer of dielectric material.

Advantageously, the structure of each electromagnetic coupler is a cylindrical structure, for example, in an annular form.

Thus, the manufacturing process is simple.

5. LIST OF FIGURES

Other features and advantages of the invention shall appear from the following description, given by way of an indicative and non-restrictive example and from the appended drawings, of which:

6. DETAILED DESCRIPTION

Figure 1:
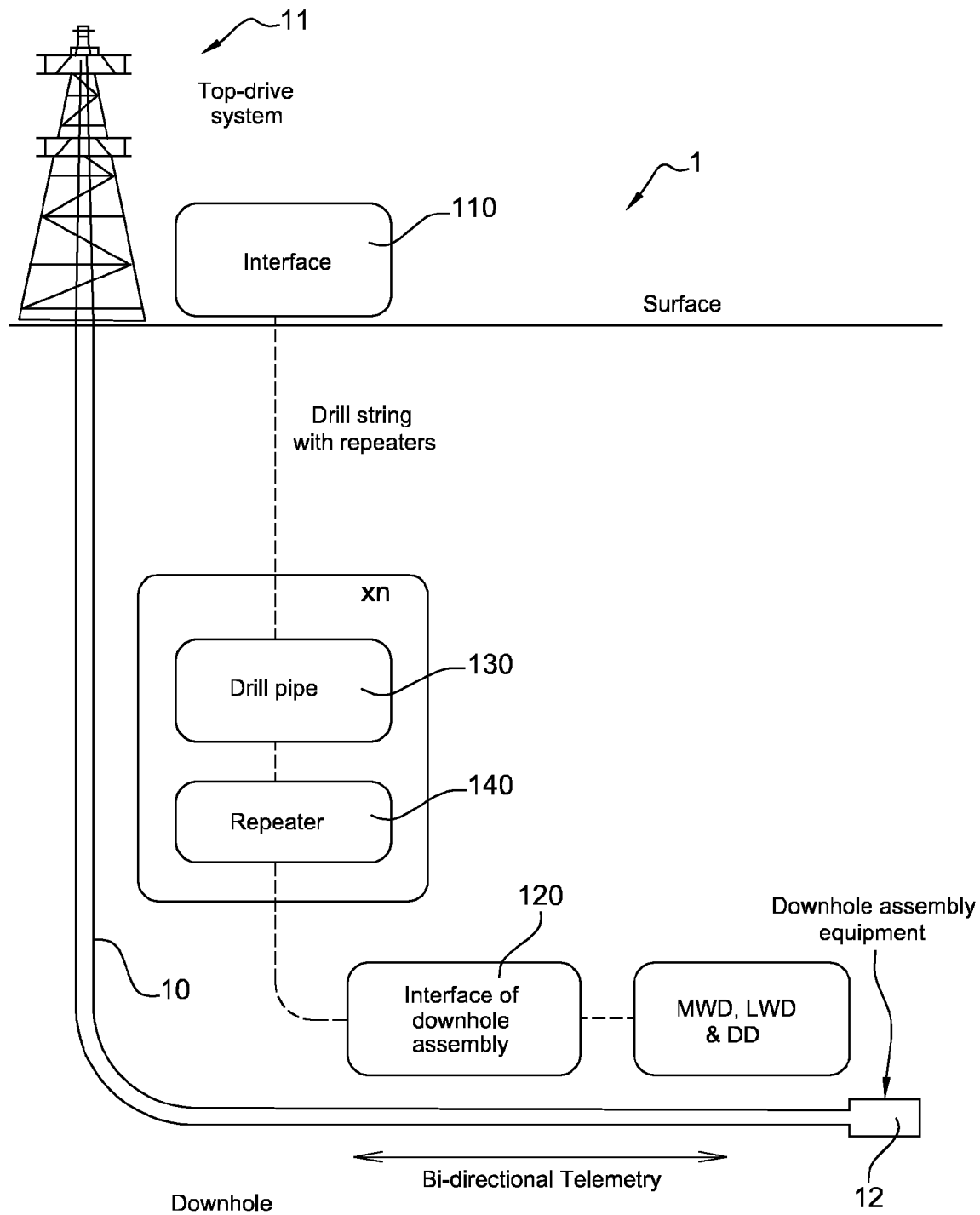
FIG. 1 depicts a drilling installation, for illustrative purposes.

The invention will be described, in at least one of its embodiments, with reference to the example of the drilling installation of FIG. 1. In this drilling installation, the pipes according to the present invention are equipped with a large-diameter tubular coaxial transmission line. The invention is of course not limited to this particular example, and may apply to any pipe, which one intends to equip with a data transmission function, in addition to its initial function of conveying substances.

Figure 2:
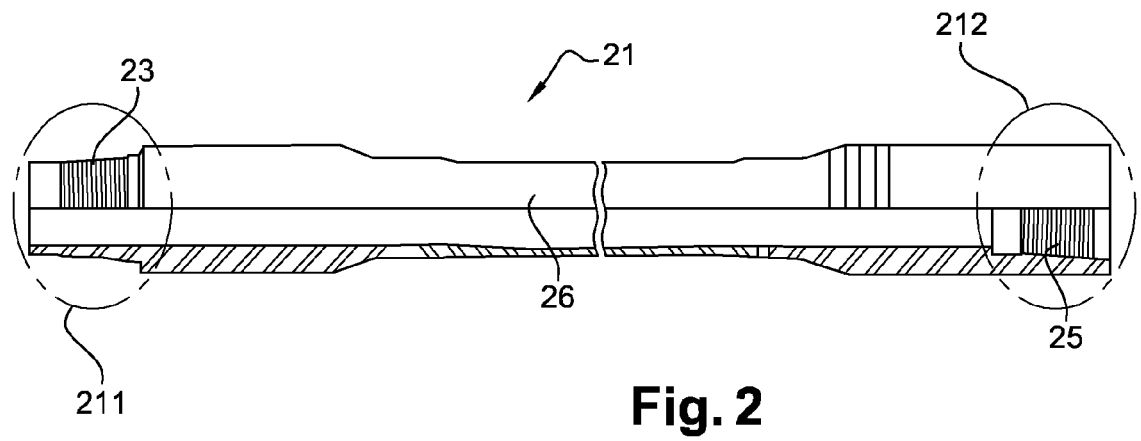
FIG. 2 is a cross-sectional view of a section of drill pipe comprising a large-diameter coaxial transmission line according to a particular embodiment of the present invention.

FIG. 2 is a cross-sectional view of a section of drill pipe 21 including a large-diameter tubular coaxial transmission line according to a particular embodiment of the present invention. As it will be described hereafter in relation with FIGS. 3, 4, and 5, it is proposed to connect two successive large-diameter tubular coaxial transmission lines by means of an electromagnetic coupler. In the example shown, this coupler is in annular form.

The depicted section 21 includes a pin end 211, having external tapered threads 23, and a box end 212, having internal tapered threads 25. Between the pin end 211 and box end 212 is the main body 26 of the section. A typical length of the main body 26 is 10 m. The main body 26 has an inner wall. Generally, the inner wall of the main body is used for conveying substances issued from the main drilling process. As will be described hereafter, the drill pipe according to a particular embodiment of the present invention has a structure comprising an inner layer of electrically conductive material that is used at the same time as the inner conductor of a large-diameter coaxial transmission line and as the active inner wall of the pipe for conveying substances issued from the main drilling process.

Drill strings in oil and gas production can extend over 3 km, which means that as many as 300 sections of drill pipe can be used in the drill string.

Figure 3:
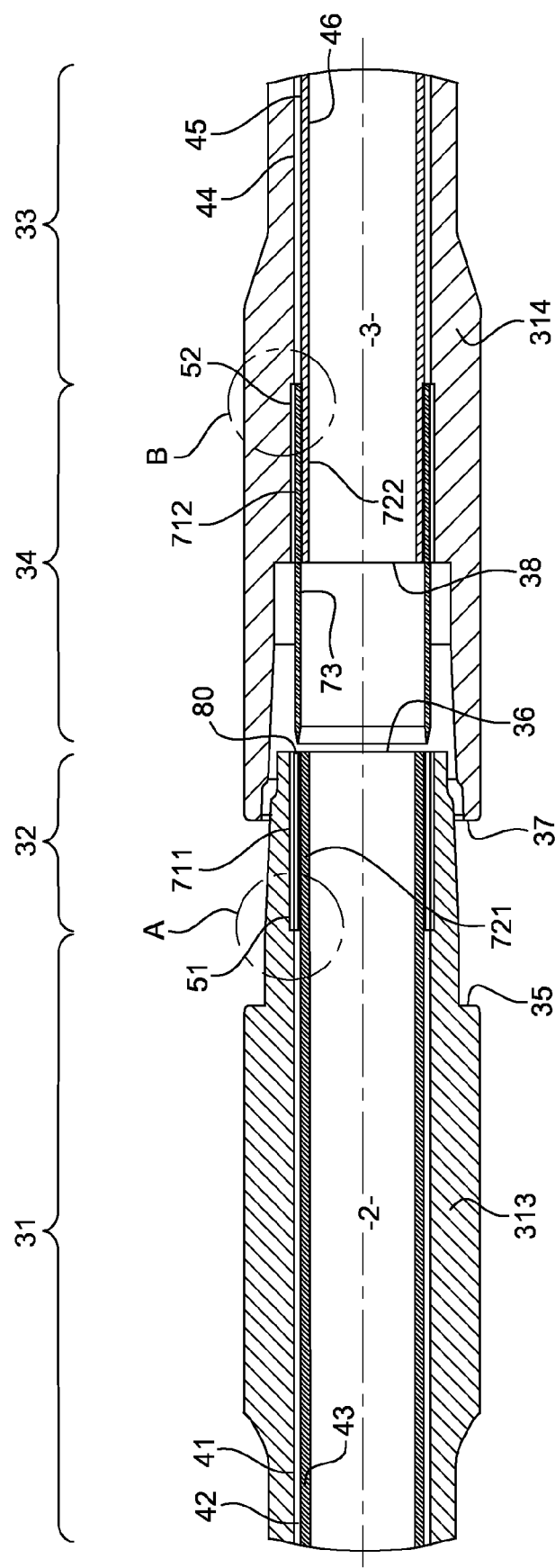
FIG. 3 is a cross-sectional view of a pin end of a first section of drill pipe unconnected to a box end of a second section of drill pipe.
Figure 4:
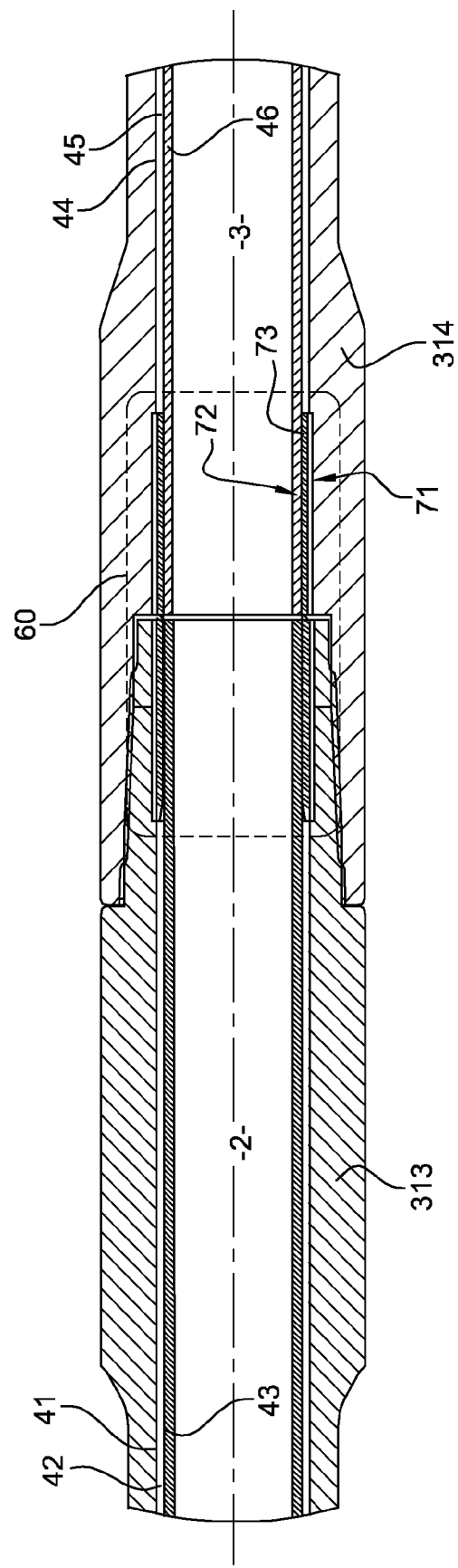
FIG. 4 is a cross-sectional view of the pin end of FIG. 3 connected to the box end of FIG. 3.

FIGS. 3 and 4 depict a pair of successive drill pipes including a first section of drill pipe 2 comprising a first section of large-diameter coaxial transmission line 31 and a first part 32 of an electromagnetic coupler, and a second section of drill pipe 3 comprising a second section of large-diameter coaxial transmission line 33 and a second part 34 of the electromagnetic coupler. In operation, the first and second sections of drill pipe are connected end-to-end so as to allow the first part 32 of the electromagnetic coupler and the second part 34 of the electromagnetic coupler to make contact and form an electromagnetic coupler according to the present invention. The electromagnetic coupler of the invention allows the first section of large-diameter coaxial transmission line 31 and the second section of large-diameter coaxial transmission line 33 to be in electromagnetic communication with each other.

As shown in FIG. 3, the pin end 313 of the first section of drill pipe 2 includes an external, primary shoulder 35, and an internal, secondary shoulder or face 36. The box end 314 of the second section of drill pipe 3 includes an external, primary shoulder 37 and an internal, secondary shoulder or face 38.

As shown in FIG. 4, when the first and second sections of drill pipe are connected end-to-end, the pin end 313 of the first section of drill pipe 2 is threaded into the box end 314 of the second section of drill pipe 3 with sufficient force so that the primary external shoulder 35 on the pin end 313 engages the primary shoulder 37 on the box end 314. As a result of this connection, the secondary shoulder 36 on the pin end 313 is reliably brought into contact with the secondary shoulder 38 on the box end 314.

Figure 5:
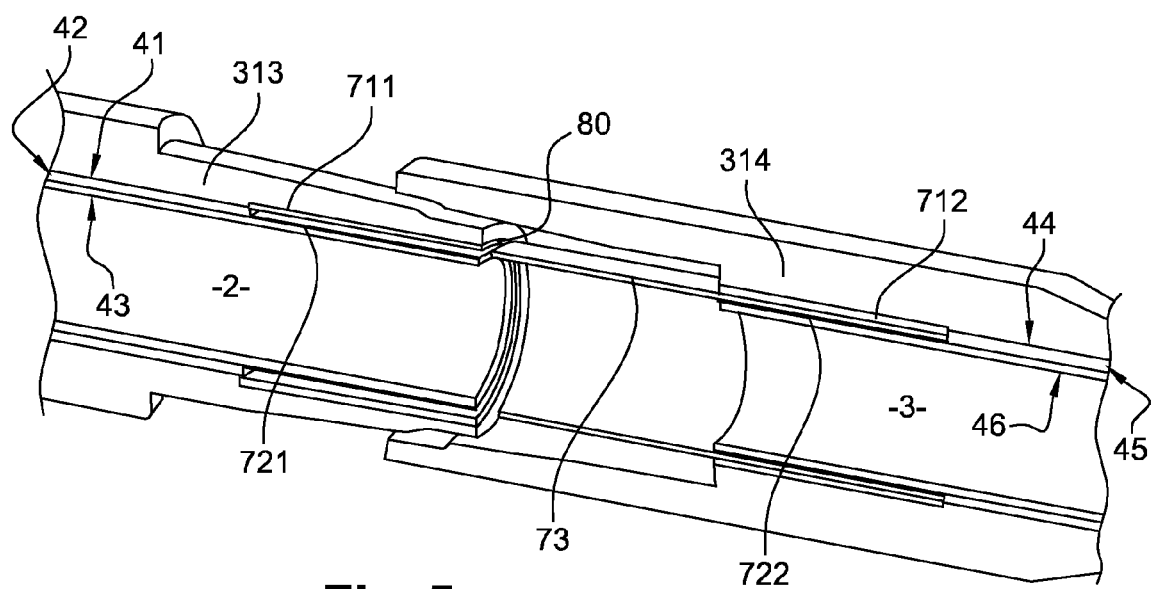
FIG. 5 is a perspective view showing an electromagnetic coupler according to a particular embodiment of the present invention.

As can be seen in the example of FIG. 4, the first section of drill pipe 2 has a structure comprising an outer layer of electrically conductive material 41, an inner layer of electrically conductive material 43, and a layer of dielectric material 42 mounted in-between the outer and the inner layers of electrically conductive material. It may be appropriate to use an epoxy bonding agent to fix the layers in position and to ensure the exclusion of water or other drilling fluids from the structure, which would otherwise impair performance. The first section of large-diameter coaxial transmission line 31 is therefore formed. More precisely, the outer layer of electrically conductive material 41 forms the outer conductor of the first section of large-diameter coaxial transmission line and the inner layer of electrically conductive material 43 forms the inner conductor (or central conductor) of the first section of large-diameter coaxial transmission line. The layer of dielectric material 42 forms the insulating layer of the first section of large-diameter coaxial transmission line. As can be seen in the example of FIG. 5, the structure of the section of drill pipe 2 is a cylindrical structure. In the examples of FIGS. 3, 4, and 5, the outer layer of electrically conductive material 41 is conformal with the inner wall of the main body of the first section of drill pipe 2, and the inner layer of electrically conductive material 43 forms the inner wall of the first section of drill pipe 2.

In an alternative embodiment, the outer layer of electrically conductive material 41 is distinct from the inner wall of the main body of the drill pipe 2. In this alternative embodiment, the outer layer of electrically conductive material 41 is, for example, a copper layer mounted in-between the inner wall of the main body of the drill pipe 2 and the layer of dielectric material 42.

The inner layer of electrically conductive material 43 takes the form of a hollow tube allowing the passage of substances (i.e. drilling fluids, slurries, debris, . . . ) issued from the main drilling process.

In a particular embodiment, in order to protect the inner layer of electrically conductive material 43 from the flow of substances, it is proposed to cover the inner layer of electrically conductive material 43 with additional layer 100 of material. This additional layer 100 could be a thin layer of non-conducting paint or plastic film, as its main function is to prevent oxidation and chemical attack by the flow of substances through the pipe. Alternatively, this additional layer 100 can be made of steel or any other material adapted to the flow of these substances. In this case, the additional layer 100 has a thickness of about a few millimeters, for example, between 3 and 6 mm. Symmetrically, the pipe 3 is represented in such a way that the inner layer of electrically conductive material 46 is covered with an additional layer 101 of the type of the layer 100.

Indeed, the construction of the pipe according to the invention can be obtained according to the following successive steps:

- construction of the main tubular body 26, made of steel, for example;
- plating of an electrically conductive material on the inner circumference of the main body, in order to form the radially outer layer 41, respectively 44, of a pipe according to the invention, this radially outer layer subsequently being denoted 'first conductive layer';
- insertion, via centering units, of a tubular conductive structure in the main body, this tubular structure comprising a tubular core, made of steel, for example, corresponding to the additional layer 100, on the outer circumference of which a plating of an electrically conductive material has preferably been applied, this plating forming the radially inner conductive layer 42, respectively 45, of a pipe according to the invention, this radially inner layer being subsequently denoted as 'second conductive layer';
- filling the space between the first and second conductive layers by means of a dielectric material 42, respectively 45.

In particular, dielectric material can be chosen among different possibilities:

- a solid material in order to improve the mechanic rigidity of the set, or
- a liquid material, for example, a dielectric oil, or even
- a gaseous material, for example, in the form of a neutral gas, for example, nitrogen, under adequate pressure.

In particular, the plating of the first conductive layer can be obtained by hydroforming, or other machining or forging, of tubing made of an electrically conductive material, with an external diameter initially less than the inner diameter of the body of the pipe.

In a particular embodiment, the outer layer of electrically conductive material 41 is made by plating, on the body 26 made of steel (for mechanical robustness), of a non-magnetic material clad (for example, copper, and/or tin, and/or zinc . . . ) on its inner side. The inner layer of electrically conductive material 43 is made by plating, on the additional layer 100 made of steel (for mechanical robustness), of a non-magnetic material clad (for example, copper, and/or tin, and/or zinc . . . ) on its outer side.

The second section of drill pipe 3 has a structure comprising an outer layer of electrically conductive material 44, an inner layer of electrically conductive material 46, and a layer of dielectric material 45 mounted in-between the outer and the inner layers of electrically conductive material. The second section of large-diameter coaxial transmission line 33 is therefore formed. More precisely, the outer layer of electrically conductive material 44 forms the outer conductor of the second section of large-diameter coaxial transmission line, and the inner layer of electrically conductive material 46 forms the inner conductor of the second section of large-diameter coaxial transmission line. The layer of dielectric material 45 forms the insulating layer of the second section of large-diameter coaxial transmission line. As can be seen in the example of FIG. 5, the structure of the section of drill pipe 3 is a cylindrical structure. In the examples of FIGS. 3, 4, and 5, the outer layer of electrically conductive material 44 is conformal with the inner wall of the main body of the second section of drill pipe 3, and the inner layer of electrically conductive material 46 forms the inner wall of the second section of drill pipe 3.

The inner layer of electrically conductive material 46 takes the form of a hollow tube allowing the passage of substances (i.e. drilling fluids, slurries, debris, . . . ) issued from the main drilling process.

In a particular embodiment, the outer layers of electrically conductive material 41 and 44, which form the inner walls of main body of the drill pipes 2 and 3 in the example of FIGS. 3, 4, and 5, are covered with steel. In an alternative embodiment, these outer layers 41 and 44 are obtained by plating of a non-magnetic metal such as, for example, copper, with a thickness of at least 10 µm, and for example, about 100 µm. This allows minimizing transmission losses by ensuring that the thickness of the copper is always greater than the skin depth for copper at frequencies greater than 50 MHz.

In a particular embodiment, the inner layers of electrically conductive material 43 and 46 are made of copper, and the layers of dielectric material 42 and 45 are made of glass-loaded PTFE (or some such similar dielectric material with a small loss tangent). In the illustrated examples, the thickness of the inner layers of electrically conductive material 43 and 46 and the layers of dielectric material 42 and 45 is of the order of a few millimeters.

Each of the first 31 and second 33 sections of transmission line is referred to as "large-diameter coaxial transmission line", because of the large diameter of both its tubular inner and outer conductors. Indeed, the diameter of the inner and outer conductors is of the same order as that of the drill pipes.

In a particular embodiment, the inner conductor of each section of transmission line 31 and 33 has a diameter of 85 mm, and the outer conductor of each section of transmission line 31 and 33 has a diameter of 95 mm. By considering this ratio of the outer and inner conductors diameters, and by assuming that the layers of dielectric material 42 and 45 are made from a compressed PTFE foam of dielectric constant 1.75 and the inner layers of electrically conductive material 43 and 46 are made from pure copper, the characteristic impedance of each section of transmission line 31 and 33 is about 5 ohm. This compares with the value of 50 ohm typical of most commercial forms of coax cable. In other circumstances, the low impedance of 5 ohm would give rise to impedance matching difficulties at the interface with standard electronic equipment, which normally requires 50 ohm terminations. However, as most of the drill string is made up of identical lengths of the 5 ohm transmission line, this is a minor complication that arises relatively infrequently at the junction with the active repeaters. For example, in the drilling installation of FIG. 1, repeaters are expected to be every 60 sections, thus infrequently. One beneficial aspect of the large-diameter coaxial transmission line is that transmission losses are very low due to the comparatively large surface area of the conducting materials and the correspondingly low density of energy in the dielectric. Losses are typically a third (in dB) of those observed for the best commercial coaxial cables at frequencies in the region 200 MHz.

Figure 6:
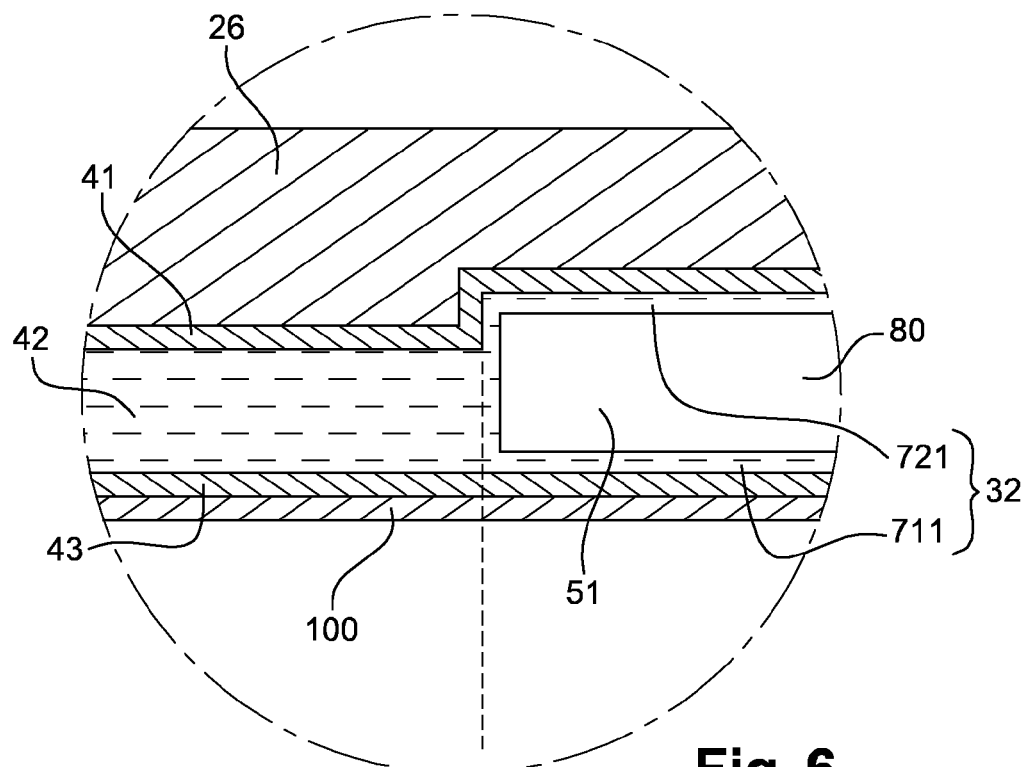
FIG. 6 is a cross-sectional view of a zone, situated at the level of a pin end of a first section of the drill pipe, marked as A in FIG. 3.

As can be seen in the example of FIG. 3, and more particularly, in FIG. 6, the first section of drill pipe 2 comprises a cylindrical recess 51. The recess 51 is located on the inside diameter of the pin end 313. The recess 51 is cut into what is, in effect, the end of the first section of large-diameter coaxial transmission line 31, in such a way that it extends between the outer layer of electrically conductive material 41 and the inner layer of electrically conductive material 43. In other words, the recess 51 defines a space between the inner and outer conductors of the first section of large-diameter coaxial transmission line 31. The recess 51 is configured so as to open axially, that is, in a direction parallel to the length of the drill pipe 2.

The second section of drill pipe 3 comprises a cylindrical recess 52. The recess 52 is located on the inside diameter of the box end 314. The recess 52 is cut into what is, in effect, the end of the second section of large-diameter coaxial transmission line 33, in such a way that it extends between the outer layer of electrically conductive material 44 and the inner layer of electrically conductive material 46. In other words, the recess 52 defines a space between the inner and outer conductors of the second section of large-diameter coaxial transmission line 33. The recess 52 is configured so as to open axially, that is, in a direction parallel to the length of the drill pipe 3.

As shown in FIG. 4, in operation, i.e. when the first and second sections of drill pipe 2 and 3 are connected end-to-end, the recesses 51 and 52 are facing each other, so as to form together a cavity adapted to receive an electromagnetic coupler 60 according to the present invention.

In a particular embodiment, the recesses 51 and 52 are lined with non-magnetic conductors, for example, with copper. This minimizes transmission losses. In the embodiment represented in more detail in FIGS. 6 and 7, only the recess 52 of the box end has walls made of the non-magnetic conductor, for example, made of copper, due to the fact that the inner 46 and outer 44 conductive layers constitute a section of the circumference delimiting the said recess 52.

Figure 7:
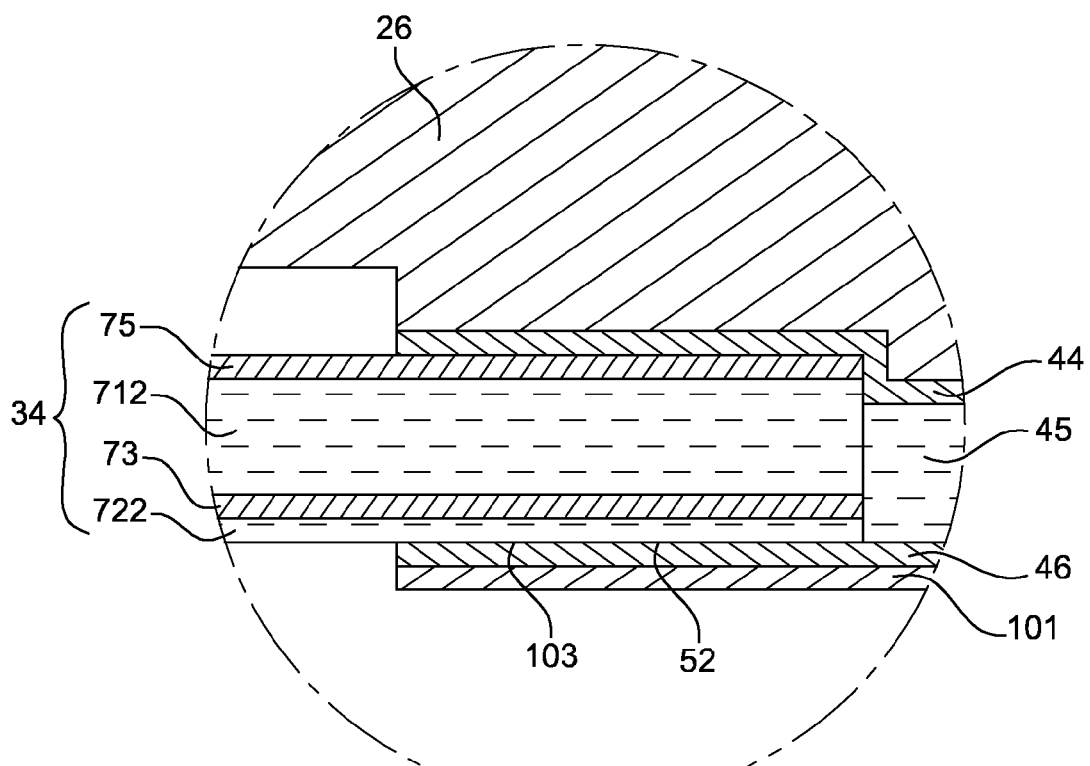
FIG. 7 is a cross-sectional view of a zone, situated at the level of a box end of a second section of the drill pipe, marked as B in FIG. 3.

In the particular embodiment illustrated in FIGS. 4, 6 and 7, the electromagnetic coupler 60 takes the form of a cylindrical plug, which is adapted to engage into the cavity formed by the cylindrical recesses 51 and 52. The electromagnetic coupler 60 comprises:
 a top layer of dielectric material 71;
 a bottom layer of dielectric material 72; and
 an intermediate layer of electrically conductive material 73 placed in-between the top 71 and bottom 72 layers of dielectric material.

In a particular embodiment, the intermediate layer of electrically conductive material 73 is made of copper, and the top 71 and bottom 72 layers of dielectric material are made of glass-loaded PTFE (or a similar dielectric material of this type with a small dielectric loss tangent).

In the particular embodiment illustrated in FIG. 4, the top layer of dielectric material 71 is thicker (several skin depths at given frequency) than the bottom layer of dielectric material 72.

In a particular embodiment, the cylindrical plug is clad with a thin outer layer of a non-magnetic conductor, such as copper, for example, forming a fourth conductive layer 75, radially outside of the coupler 60. This minimizes transmission losses by ensuring good ground-plane continuity along the whole length of the coupler. Without the cladding, there is an increased risk of currents following an unpredictable path between the joined ends of the two drill pipes.

Advantageously, the third and fourth conductive layers, 73 and 75 respectively, form full tubular structures and do not have windings.

The fourth conductive layer 75 could itself be covered by a covering, which protects against physical and/or chemical attacks to which it could be exposed in a situation of use. This protective covering can be a dielectric, for example, Teflon or even zirconia.

In operation, the top layer of dielectric material 71 extends inside the cavity in such a way that end portions of the outer layers of electrically conductive material 41 and 44 are separated from the intermediate layer of electrically conductive material 73 by the top layer of dielectric material 71. In addition, the bottom layer of dielectric material 72 is extending inside the cavity such that end portions of the inner layers of electrically conductive material 43 and 46 are separated from the intermediate layer of electrically conductive material 73 by the bottom layer of dielectric material 72.

It is to be noted that another large-diameter coaxial transmission line is formed at the junction of the drill pipes 2 and 3. More precisely, the intermediate layer of electrically conductive material 73 forms the outer conductor, the end portions of the inner layers of electrically conductive material 43 and 46 form the inner conductor, and the bottom layer of dielectric material 72 forms the insulating layer of this other large-diameter coaxial transmission line.

Thus, in operation, currents flow through the inner layer of electrically conductive material 43, then, when reaching a first end of the electromagnetic coupler 60, couple and pass into the intermediate layer of electrically conductive material 73 by an electromagnetic coupling effect by waveguiding. Currents flow the length of the intermediate layer of electrically conductive material 73, then, when reaching a second end of the electromagnetic coupler 60, couple by waveguiding and pass into the inner layer of electrically conductive material 46 by an electromagnetic coupling effect, having suffered very little loss of energy.

In an operational condition, currents also circulate through the outer layer of electrically conductive material 41, then, when they reach a first end of the electromagnetic coupler 60, couple and pass into the radially outer layer 75 of the coupler 60. This radially outer layer 75 is made of non-magnetic electrically conductive material 73, in order to obtain an electromagnetic coupling effect by waveguiding. The currents flow along the radially outer conductive layer 75, then when they reach a second end of the electromagnetic coupler 60, couple by waveguiding and pass into the outer layer of the electrically conductive material 44 due to an electromagnetic coupling effect, having suffered a very low loss of energy.

As an alternative, which is not shown, the outer layer of the electrically conductive material 41 cannot lead to the level of the side before the coupling of the pipe 2 with the complementary pipe 3, and respectively the same with the layer 44, and the same for the inner layers 43 and 46. For example, the contact surface between the two pipes is thus completely made of steel in order to increase the mechanical robustness. If the retreat of the layer of electrically conductive material is about a few tens of millimeters, relative to the side before the coupling, the performances of the coupler are preserved.

A low-loss coupling mechanism (between the first 31 and second 33 sections of large-diameter coaxial transmission line) that is entirely electromagnetic, with ground-plane continuity, is therefore obtained. An advantage of the electromagnetic coupler of the present invention is that as a consequence of its axial symmetry and its electromagnetic coupling characteristic, the transmission of energy through two successive large-diameter coaxial transmission lines is entirely insensitive to the angular orientation of the drill pipes. In other words, the electromagnetic coupler of the invention functions equally well for all angles of rotation of one drill pipe with respect to the other. This means that over the lifetime of the drill pipes, there should be no variation in coupler performances due to wear and tear in the screw threads of the drill pipe ends.

There are several variations in the way in which the electromagnetic coupler of the invention could be constructed and inserted into the drill pipes.

In the example shown in FIGS. 3 and 5, all three layers of materials of the electromagnetic coupler 60 are fixed in the box end 314 of the second section of drill pipe 3, whilst only the dielectric layers of the other end are fixed in the pin end 313 of the first section of drill pipe 2.

More precisely, the first section of drill pipe 2 comprises a first part 32 of the electromagnetic coupler embedded in the recess 51. The first part 32 of the coupler comprises a first part of the top layer of dielectric material 711 and a first part of the bottom layer of dielectric material 721. As illustrated, the first part of the top layer of dielectric material 711 is separated from the first part of the bottom layer of dielectric material 721 by a gap 80.

The second section of drill pipe 3 comprises a second part 34 of the electromagnetic coupler embedded in the recess 52. The second part 34 of coupler comprises a second part of the top layer of dielectric material 712, a second part of the bottom layer of dielectric material 722, and the intermediate layer of electrically conductive material 73. One end of the intermediate layer of electrically conductive material 73 is lying within the recess 52 whilst another free end extends outside the recess 52. Preferably, the free end sticks out in the box section of the second section of the drill string 3 in such a way that its insertion into the recess 51 only takes place when the pipes 2 and 3 are almost correctly aligned, and when at least one or several revolutions have been carried out at the level of the complementary threads, 23 and 25 respectively. There is therefore no risk of damaging the coupler 60 during the assembly of the pipes.

As shown in FIG. 7, the second section 34 of the coupler 60 incorporated in the recess 52 is held there by means of a layer of glue 103.

In the assembled position, the second layer of dielectric material 71 of the coupler 60 is formed by the overlay of the layers 711 and 712 of each of the pipes 2 and 3. Respectively, the third layer of dielectric material 72 of the coupler 60 is formed by the overlay of the layers 721 and 722 of each of the pipes 2 and 3.

In operation, i.e. when the first and second sections of drill pipe are connected end-to-end, the free end of the intermediate layer of conductive material 73 slides into the gap 80, and is free to rotate and move longitudinally as the sections of drill pipe are screwed into their final positions.

In an alternative embodiment, it is possible to manufacture the three layers of materials 71, 72 and 73 of the electromagnetic coupler as a single component, and to allow the free end of the whole coupler to slide and rotate in the now larger recess cut in the pipe end.

In a particular embodiment, non-magnetic metal clad is on both sides of the intermediate layer of electrically conductive material 73, on the lower side of the recess 51 and on the upper side of the gap 80.

A 3D electromagnetic simulation was carried out. CST Microwave Studio (TM registered) software has been used to simulate the performances in term of insertion loss (S21) of an electromagnetic coupler of the present invention of length 250 mm and with a dielectric constant of 2.2. The results of the 3D electromagnetic simulation show that losses remain less than 0.5 dB over a very wide frequency range of 200 to 600 MHz.

Although the present disclosure has been described with reference to a limited number of examples, the person skilled in the art will recognize that changes may be made in form and detail without departing from the scope of the disclosure and/or the appended claims.

The invention claimed is:

1. An ensemble comprising:
    a pipe for conveying substances which can flow, the pipe including a structure forming a coaxial transmission line comprising:
    a first tubular layer of electrically conductive material;
    a second tubular layer of electrically conductive material; and
    at least one first layer of dielectric material mounted in-between the first and the second layers of electrically conductive material, such that:
        the first layer of electrically conductive material forms an outer conductor of a section of the coaxial transmission line; and
        the second layer of electrically conductive material forms an inner conductor of the section of coaxial transmission line;
    and further comprising an electromagnetic coupler for coupling the coaxial transmission line with a complementary coaxial transmission line carried by a pipe complementary to the pipe.

2. An ensemble according to claim 1, wherein the pipe comprises a main body having an inner wall, wherein the first layer of electrically conductive material is placed against the inner wall of the main body of the pipe.

3. An ensemble according to claim 1, wherein the second layer of electrically conductive material forms an active inner wall of the pipe.

4. An ensemble according to claim 1, wherein the electromagnetic coupler is partly housed in a recess formed on an end of the pipe, or a box end of the pipe, the recess extending between the first layer of the electrically conductive material and the second layer of electrically conductive material.

5. An ensemble according to claim 1, wherein the first and second layers of electrically conductive material are made of a non-magnetic material.

6. An ensemble according to claim 1, wherein the pipe is a drill pipe adapted to be used in oil and gas exploration or production.

7. A pipe assembly comprising:
- at least one pair of successive ensembles according to claim 1, such that the electromagnetic coupler permits coupling of a pair of successive pipes;
- and wherein each pipe of a given pair of successive pipes comprises a recess formed at an end of the pipe, the recess extending between the first layer of electrically conductive material and the second layer of electrically conductive material,
- and wherein, for the given pair, when the pipes are connected end-to-end, the recesses are facing each other, so as to form together a cavity adapted to receive the electromagnetic coupler.

8. The pipe assembly according to claim 7, wherein each electromagnetic coupler includes a structure comprising:
- a second layer of dielectric material;
- a third layer of dielectric material; and
- a third layer of electrically conductive material mounted in-between the second and third layers of dielectric material,
- and wherein, for the given pair, when the pipes are connected end-to-end:
  - the second layer of dielectric material extends inside the cavity such that a portion of the first layer of electrically conductive material of each pipe is separated from the third layer of electrically conductive material by the second layer of dielectric material; and
  - the third layer of dielectric material extends inside the cavity such that a portion of the second layer of electrically conductive material of each pipe is separated from the third layer of electrically conductive material by the third layer of dielectric material.

9. A pipe assembly according to claim 8, wherein the second layer of dielectric material is thicker than the third layer of dielectric material.

10. A pipe assembly according to claim 8, wherein a structure of each electromagnetic coupler is a cylindrical structure.

* * * * *